Patented Nov. 5, 1940

2,220,062

UNITED STATES PATENT OFFICE 2,220,062

PHENOL-CELLULOSE RESIN

Leon E. Champer, Atchison, Kans., assignor to The Chemical Foundation, Incorporated, a corporation of Delaware No Drawing. Application June 4, 1938,
Serial No. 211,812

6 Claims. (Cl. 260—10)

This invention relates to the production of plastics, more particularly to the manufacture of improved thermosetting plastics from special types of cellulosic material.

As is known, the use of synthetic resins has been extended very considerably in recent years. In addition to employment in the electrical and mechanical fields, such resins are rapidly entering fields in which their decorative or esthetic value is an important factor. In these newer uses, in addition to such physical characteristics as high dielectric and mechanical strength, the resins should also be quite light in color so as to permit the establishment, by suitable pigmentation, of the color tones or values which are so important from the esthetic standpoint. To insure adoption for many uses, such plastics also must be inexpensive. These criteria of light color and low cost have been difficult to satisfy with the older forms of resins, such as the phenol-formaldehyde resins, which are normally dark colored and costly.

Recent developments in the art, therefore, represent attempts not only to improve the physical and chromatic characteristics of these synthetic resins, but also to lower their cost, by using less expensive reactants, to a point where they can more favorably compete with cheaper products, such as metals, woods, plasters, and the like. Thus, it has been proposed to produce synthetic resins from cheap vegetable materials, such as pentosans and similar carbohydrates, to produce a furfural type resin. It has also been suggested to produce synthetic resins from cellulose by reacting cellulose with phenol at high temperatures and in the presence of considerable amounts of strong acid catalyst. The resins producible when following such suggestions are dark colored products which have no great resistance to hydrolysis. In such earlier proposals the cellulosic starting materials which usually was indicated was wood cellulose.

As a result of considerable experimentation, it has been found that greatly improved synthetic resins of the thermosetting type may be produced from special types of cellulose. It has been found that such cellulose reacts with phenol to produce an ultimate resin which is very light in color and in addition presents the other desirable characteristics, such as marked resistance to hydrolysis and high dielectric and mechanical strength.

The present invention is based upon the discovery that the cellulose produced from certain types of annually grown crops is peculiarly amenable to reaction with phenolic bodies and that, when this type of cellulose is reacted with phenol, or a homologue, under properly controlled conditions of temperature and time, a water-white resin of the thermosetting type may be produced. It has been found particularly that the cellulose constituent of the stalks of the castor bean, okra, hemp and flax is especially suitable material from which to produce such new plastics.

The reasons why such special forms of cellulose should be so effective for the purposes of the invention are difficult to ascertain. The special efficacy of this type of cellulose, no doubt, is due to its characteristic structure. It is a fact that the stalks of the particular plants mentioned are characterized by a very high alpha cellulose content and a low pentosan and lignin content. These plants quite likely contain relatively small amounts of amorphous material bound up with the crystalline cellulose structure and therefore permit a more direct or positive reaction of the phenol with the cellulose itself, whether this be a micellar surface, or a permutoid type of reaction. Whatever may be the particular mechanism of the reaction, it is a fact that it is characterized by a definite specificity with respect to the cellulose material employed. For example, and as will be observed more fully hereinafter, the novel water-white plastics may be prepared without employing any catalyst. All earlier suggestions in the art indicate that a catalyst must be employed to secure a reaction between cellulose and phenol. Again, it will be observed that the cellulose which is here employed may be liberated from the associated constituents of the stalk under markedly less drastic conditions than those necessary in the production of alpha cellulose from wood. These mild conditions of fiber liberation would seem to indicate that the noncellulose constituents of these plants are associated with the cellulose in a manner quite different from that which obtains in wood. A further fact which indicates a definite specificity of the cellulose-phenol reaction, in respect to producing the new products contemplated herein, is that the method of producing the cellulose itself must carefully be controlled and constitutes an important phase of the invention. As will be seen, it is not sufficient merely to employ cellulose from the sources mentioned, but such cellulose must be liberated in a special manner in order to insure the production of the water-white plastics.

These several factors will be appreciated more readily from a consideration of an illustrative method of production from a preferred material, namely, castor bean cellulose.

In producing the new plastic, 500 grams of cut, dried castor bean stalk was treated with 4,000 cc. of 0.32 N. nitric acid at a temperature of 100° C. for a period of 3 hours. The mass was then filtered to separate the cellulose from the acid solution. The filtrate or spent acid, after replacement of the acid actually consumed, was further employed to pulp additional quantities of the fibrous starting material.

The filtered cellulose was then beaten for a period of one-half hour in a standard paper mill beater. The pulp was washed to remove all residual acid and was then bleached with sodium hypochlorite. The bleached pulp was washed thoroughly to remove the chlorine and was then dried with alcohol. The dried cellulose was mixed with an excess of phenol in a proportion of 1 part (dry weight) of cellulose to 1.2 parts of phenol, and was heated for 2 hours at a temperature of 95° C. to 110° C. It was observed that, after about 36 hours, the phenol and cellulose began to react, as was evidenced by a change in the cellulose from white to translucent. When the reaction was complete, the excess phenol was removed by vacuum distillation.

The molten mass of the initial fusible resin was then discharged from the reaction kettle to shallow containers and allowed to cool. This initial resin was found to be convertible to the insoluble and fusible form by heating to temperatures of the order of 170° C., more or less, and pressures of the order of 1,000 pounds per square inch.

It is found that the melting point of the initial resin could be varied by varying the temperature during the vacuum distillation. Instead of removing excess phenol by vacuum distillation, as will be understood, this may be accomplished by steam distillation. It is found further that slight additions of oxalic acid to the initial resin raises its melting point.

The resin produced by this type of operation, in both the initial and final stage, is a clear water-white solid. In commercial operations, as will be understood, the final form of the resin may be modified widely to suit the exigencies of the particular use for which it is intended. Thus, the initial form of the resin, after solidification, may be milled and mixed with any desired type of inert fillers, such as wood flour, in varying proportions. The pressure and temperature in the final stage may similarly be varied in the manner known to those skilled in the art. In a typical case, using a temperature of 170° C. and 1,000 pounds per square inch pressure, the resin is transformed to the final or infusible form in about 2 minutes. In another method of operation, the initial resin may be dissolved in a suitable solvent and the resulting solution used to impregnate fillers, such as absorbent paper, and the like, and such sheets may be formed into laminated moulded objects by the application of heat and pressure. The initial or A-stage resin may also be dissolved in tung oil and the like to produce improved varnishes and enamels.

As intimated hereinbefore, a very important feature of the invention is the treatment of the starting material to produce the special cellulose. In the indicated example, the castor bean stalks were digested with a 0.3 N. nitric acid solution. It has been found that, if the nitric acid concentration is too high, or if, with a given nitric acid concentration, the temperature is too high or the digestion time is too long, the resin which is produced will be relatively dark colored. Light colored resins may be produced from cellulosic material of the character described when using nitric acid concentrations as low as 0.16 N. Certain other of the starting materials require a higher acid concentration and up to substantially 0.50 N. acid. The optimum conditions for a particular type of starting material can, with these precautions in mind, be determined readily by those skilled in the art.

It has been found that the cellulose from the several sources mentioned may be conditioned, for the purpose of making the plastic, by a combined alkaline and acid digestion. For example, improved light colored plastics have been produced by treating the cellulosic starting material with sodium hydroxide solutions of from 4 to 8%, for 4 hours and at a temperature of 100° C. Similarly, solutions of soda ash or other equivalent alkaline solution may be used. After this preliminary alkaline digestion, the pulp is washed and then treated with a dilute nitric acid solution. In this particular process of the two stage digestion, however, the nitric acid which is employed need be only about one-half the concentration which is required when a single acid digestion step is employed. In this illustrative case, after preliminary partial digestion with the alkali, the washed pulp may be treated with nitric acid of about 0.1 N. The double digestion treatment presents some advantages, particularly in that it cuts down the amount of nitric which is required and provides a wider latitude in the preparation of the cellulose. In such a double or two-stage digestion treatment, the conditions during the alkali digestion should be controlled so as to produce a marked softening of the cellulosic material, but with no appreciable hydration of the cellulose.

It will be understood that the light colored plastics, producible under the present invention, may be mixed with suitable pigments or dyes to produce products of substantially any desired color value. Because of the light color of the pure resin, the tinctorial value of the pigment or dye is thus utilized to the greatest advantage, since there is substantially no masking of the color by the resin itself.

It will be appreciated that the primary plastics described herein may be modified within wide ranges by the incorporation of polymerizable oils, plasticizers, natural resins, other co-polymerizable resins, lubricants, and the like, to produce an ultimate fusible or infusible product of the desired dielectric, physical and chromatic characteristics.

The improved resins defined herein, as noted, are much lighter in color than earlier resins produced from the same general type of starting materials. These resins are also technically improved products inasmuch as they present a much higher resistance to hydrolysis than do the earlier resins. These improved characteristics, as noted, are difficult to explain; they are probably due, in part, to the character of the particular cellulose itself and in part to the special reaction conditions under which, as will be appreciated, any drastic degradation of the cellulose is prevented. It is believed that in the process the cellulose-phenol linkage takes place through the hydroxyl groups, rather than through the aldehydic groups for, it has been observed that, in physical characteristics, the new products more closely resemble the alkyd type of resin than the phenol-aldehyde type. Whatever may be the rationale of the reaction, it is found, as a fact, that these products are in fact new, possessing characteristics which sharply differentiate them from the products heretofore made from similar starting materials.

While preferred modifications of the invention have been described, it is to be understood that these are given merely to explain the underlying principles involved, and not as limiting the process or products to the particular exemplary embodiments mentioned.

I claim:

1. A thermosetting synthetic resin which comprises the reaction product of a phenol and cellulose produced from pure cellulose of the stalk of the castor bean plant, said cellulose being produced by treating said stalk material with a nitric acid solution of between 0.16 N to 0.5 N for a period of substantially three hours.

2. A method of producing light colored synthetic resins which comprises, digesting the stalk fiber of the castor bean plant with a nitric acid solution of between 0.16 N to 0.5 N at elevated temperatures for substantially three hours to remove the non-cellulosic constituents with no substantial hydrolysis of the cellulose, separating the cellulose from the digesting agent and reacting such cellulose with phenol at a temperature of approximately 100° C. and for a period of approximately 70 hours to insure the production of a resinous product.

3. A method of producing light colored synthetic resins which comprises, reacting purified unhydrolyzed castor bean cellulose with phenol, and without a catalyst, at a temperature of between substantially 95° C. and 110° C. for a period of approximately 70 hours.

4. A method of producing light colored synthetic resins which comprises, reacting purified unhydrolyzed castor bean cellulose with an excess of phenol, and without a catalyst, at a temperature of between substantially 95° C. and 110° C. for a period of approximately 70 hours, and distilling off the unreacted phenol.

5. A method of producing light colored synthetic resins which comprises digesting castor bean stalks with a nitric acid solution of substantially 0.3 N at substantially 100° C. for a period of substantially three hours, washing and bleaching the purified cellulose, reacting the purified cellulose with an excess of phenol, and without a catalyst, at a temperature of between substantially 95° C. and 110° C. for a period of approximately 70 hours, and distilling off the unreacted phenol to recover the fusible and soluble synthetic resin, and subjecting such resin to polymerizing conditions of temperature and pressure to produce an insoluble and infusible product.

6. A method of producing light colored synthetic resins which comprises, digesting the stalk fiber of the castor bean plant with a caustic soda solution of between substantially 4% and 8% strength at substantially 100° C. for a period of substantially four hours; separating the fibrous material from the caustic solution and digesting such material with a nitric acid solution of between 0.08 N and 0.25 N; separating the purified cellulose from the acid solution and reacting such cellulose with an excess of phenol at a temperature of substantially 100° C. and for a period of approximately 70 hours to insure the formation of a resinous reaction product.

LEON E. CHAMPER.